United States Patent [19]
Miyake et al.

[11] 3,835,626

[45] Sept. 17, 1974

[54] VACUUM CLEANER

[75] Inventors: Yuji Miyake; Hideo Kashiwara; Jun Mizukawa, all of Hyogo, Japan

[73] Assignee: Sanyo Electric Co. Ltd., Osaka, Japan

[22] Filed: Nov. 4, 1971

[21] Appl. No.: 195,802

Related U.S. Application Data

[63] Continuation of Ser. No. 806,974, March 13, 1969, abandoned.

[52] U.S. Cl. ........... 55/319, 55/382, 55/372, 55/481, 55/DIG. 3, 15/327 R
[51] Int. Cl. ........................................ B01d 50/00
[58] Field of Search ............ 55/372, 315, 318, 319, 55/323, 334, 342, 343, 366, 378, 374, 361, 305, 357, 376, 418, 429, 472, 481, 482; 15/327 R, 327 D, 327 E, 347, 352, 332

[56] References Cited
UNITED STATES PATENTS

| | | | |
|---|---|---|---|
| 1,887,600 | 11/1932 | Replogle | 55/378 X |
| 2,175,647 | 10/1939 | Replogle | 55/378 X |
| 2,211,934 | 8/1940 | McAllister | 55/429 X |
| 2,558,496 | 6/1951 | Reeves | 15/332 X |
| 3,023,447 | 3/1962 | Senne | 15/314 |
| 3,480,330 | 11/1969 | Hirs et al. | 55/341 X |

FOREIGN PATENTS OR APPLICATIONS

| | | | |
|---|---|---|---|
| 998,157 | 9/1951 | France | 55/361 |

*Primary Examiner*—Dennis E. Talbert, Jr.
*Attorney, Agent, or Firm*—Darby & Darby

[57] ABSTRACT

A vacuum cleaner including a two-stage filtering system positioned within a cleaner body for filtering the air before it passes through an electric motor fan unit. The two-stage filtering system comprises a first dust collecting receptacle having incorporated therein a filtering screen of a relatively large mesh size and detachably positioned within the cleaner body. The filtering system further includes a second filtering member of fine mesh size located immediately downstream of the first dust collecting receptacle within the cleaner body with its inlet opening communicating with the outlet opening of the first receptacle. Air with entrained dirt and dust particles taken into the cleaner body passes initially through the first receptacle where dust having a relatively large size is filtered from the air stream by the filtering screen and through the second filtering member where fine dust particles are removed from the air flow.

9 Claims, 15 Drawing Figures

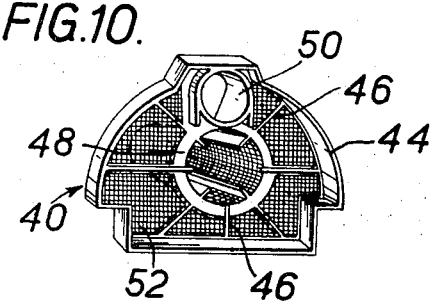
FIG.10.
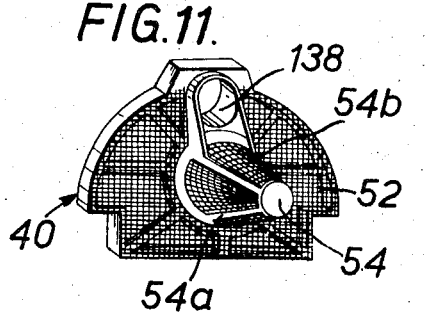
FIG.11.
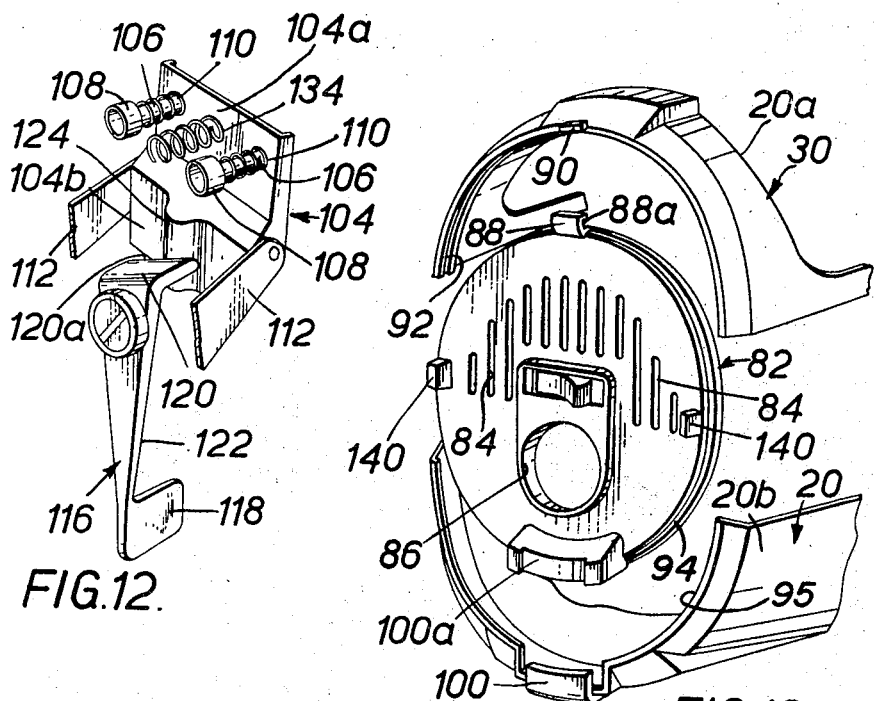
FIG.12.
FIG.13.
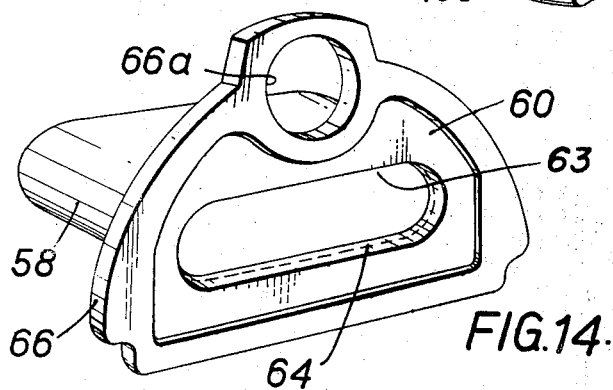
FIG.14.

VACUUM CLEANER

This application is a continuation of prior copending application Ser. No. 806.974 filed Mar. 13, 1969, now abandoned.

BACKGROUND OF THE INVENTION

This invention relates to a new and improved vacuum cleaner and more particularly to a vacuum cleaner having a improved dust collecting system which gathers large volume of dust and dirt in an effective manner.

In conventional vacuum cleaners a cloth bag is employed for filtering air through the cleaner body. Prior to the cleaning operation another disposable filter bag made generally of a piece of paper is inserted within the fixed cloth bag which together forms a filtering system. Upon operation of the cleaner, the air drawn into the cleaner passes through the filtering system and almost all of the dust carried with the air stream is collected primarily in the paper bag. As this dust collection proceeds, an incalculable number of fine dust particles stick to the entire inner surface of the paper bag resulting in the clogging of fine filtering apertures in the bag with dust particles. This premature clogging of the paper bag tends to obstruct the free passage of the air flow through the cleaner and greatly reduces air suction by the cleaner only minutes after it has been put into operation. As is apparent to those skilled in the art, this reduction of air intake capability of the cleaner causes, in return, the reduction of its dust collecting ability. Therefore, in order to maintain the desired dust collecting capability it becomes necessary to change the paper bag with a fresh one well before the old one is substantially filled with the collected dust. However, frequent replacement of the paper bags is troublesome as well as costly. As a paper bag is fragile in nature, some limitations are placed on the maximum dimensions of the bag, which in turn restricts the maximum space within the bag available for the storage of collected dust and dirt. This also necessitates frequent change of dust bags since such bags can accommodate only a small amount of dust removed from the air stream through the cleaner.

Another important disadvantage with the conventional vacuum cleaners lies in the difficulty encountered in disposing of the dust collected during operation. It is therefore highly desirable to provide a vacuum cleaner which completely eliminates the above noted shortcomings.

An object of the present invention is to provide a new and improved vacuum cleaner having a unique dust collecting system in which dust can be accumulated in an amount and at an efficiency substantially greater than was possible with conventional cleaners.

A further object of the invention is to provide a new and an improved vacuum cleaner which considerably facilitates the disposal of the collected dust and dirt.

A still further object of the invention is to provide a new and improved vacuum cleaner in which the desired dust. collecting capability thereof is maintained throughout a long period of its operation.

SUMMARY OF THE INVENTION

The vacuum cleaner according to the invention comprises a body including a motor tan unit and a dust collecting case detachably connected to the body and cooperating with the body to form a suction system. The suction system comprises an inlet fitting which may be formed adapted to be connected to a tubular suction hose. A dust collecting chamber communicates with the inlet fitting, said dust collecting chamber being defined by the detachable dust collecting case and having an outlet opening which is covered by a filter screen having relatively large meshes. An elongated passage is formed in the body and is adapted to be connected at its one end to said outlet opening of the dust collecting chamber. The passage extends toward the position at which the motor fan unit is positioned and includes an elongated filter bag. An exhaust air chamber is formed in the body and extends from the position of the motor fan unit to an outlet of the system. The inlet fitting may be formed in the body or in the dust collecting case. In case where the inlet fitting is formed in the body, the dust collecting chamber has an inlet opening directly communicating with the inlet fitting.

The filter screen of relatively large meshes which is used for the vacuum cleaner of the invention is preferably so shaped as to include a nose portion extending into the dust collecting chamber. This nose portion is so formed that the suction air flow through the inlet fitting blows along a generation line of the nose portion. In order to ensure this operation, guide means may be provided for introducing the suction air flow through said inlet fitting along a generation line of the nose portion.

Preferably, the dust collecting chamber is so connected to the inlet fitting and the elongated passage that the air flow is substantially turned around in the dust collecting chamber. The dust collecting case may have an end opening which is closed by a detachable screen lid. This screen lid has an opening adapted to communicate with the inlet fitting and screen portions adapted to communicate with the elongated passage.

In the preferred embodiment the inlet fitting is formed at the top of the body and is elongated substantially in a horizontal direction. The elongated passage is positioned beneath the inlet fitting. The dust collecting case is positioned in a cavity formed in the body behind the inlet fitting and the elongated passage. The exhaust air chamber extends substantially horizontally at the bottom of said body. The body may have an opening through which access may be had to the bottom end of the filter bag in the elongated passage. This opening is covered by a closable lid. The filter screen is preferably formed in a substantially funnel or saucer shape for receiving dust shaken from the filter bag. The body has an end on which the body may stand lengthways.

In another embodiment of the invention the dust collecting case is mounted at the front end of the body. The dust collecting case has at its top end an inlet opening communicating with the inlet fitting and an outlet opening communicating with the elongated passage. The inlet fitting is substantially vertically elongated and the elongated passage is directed first vertically upward and then substantially horizontally rearwards.

Suitable clamp means are provided for securing the dust collecting case to the body.

According to the present invention, there is provided an improved vacuum cleaner including upper and lower cleaner body sections which are fasteneded together to form a main cleaner body. The upper cleaner body has at its front top an inlet fitting for receiving a tubular cleaner hose. The detachable dust collecting case is positioned within the upper body in the area immediately downstream of the inlet fitting in the direction of the input air flow through the cleaner. The dust collecting case includes an air inlet communicating with the inlet fitting and a filtering screen of greater mesh size for removing relatively large dust and dirt from the air flow through the case, said screen defining the air outlet of the case. The construction of the case is such that dust of greater mass filtered from the air stream by the filter screen accumulates onto the screen in a layer within the case and is pressed into a compact body under the high pressure force of the flowing input air stream. In addition to the dust collecting case, a dust bag, made preferably of a piece of cloth, is provided within the cleaner body downstream of the case with its open end communicating with the screened outlet opening of the dust collecting case. Substantially all of fine dust particles which manage to pass through the filter screen of the dust collecting case are trapped by this cloth bag and dust free air flows through the air discharge chamber out of the cleaner body.

BRIEF DESCRIPTION OF THE DRAWINGS

The invention will be fully understood from the following description taken in connection with the accompanying drawings in which:

FIG. 10 is a front perspective view of a pre-filter means for use in the present vacuum cleaner;

FIG. 11 is a rear perspective view of the pre-filter means;

FIG. 12 is a perspective view of a locking mechanism for holding the detachable dust collecting unit in position within the cleaner body;

FIG. 13 is a fragmented exploded view of the rear end portion of the vacuum cleaner showing the manner in which the upper and lower body sections and an end cover are assembled together;

FIG. 14 is a perspective view of the support plate for supporting a filter bag in the space immediately downstream the dust collecting chamber.

DESCRIPTION OF THE PREFERRED EMBODIMENTS

Figure 1:
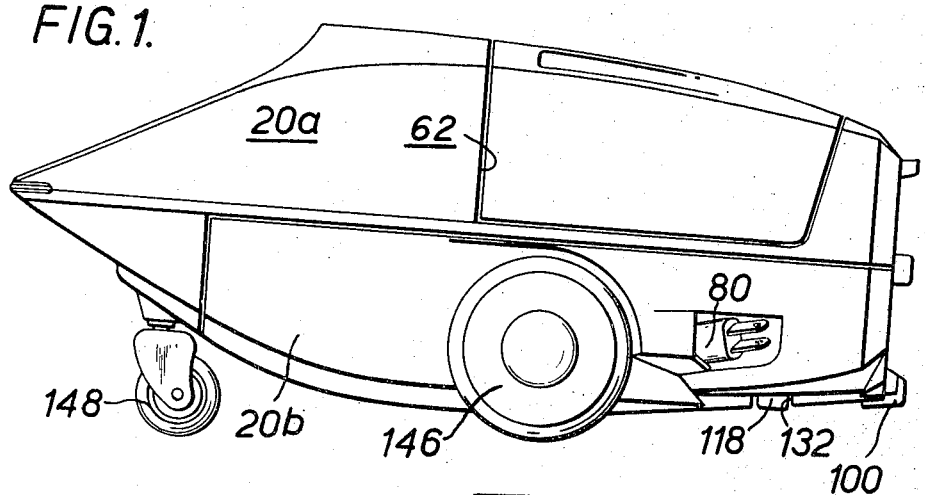
FIG. 1 is a side elevational view of a vacuum cleaner embodying the present invention.
Figure 2:
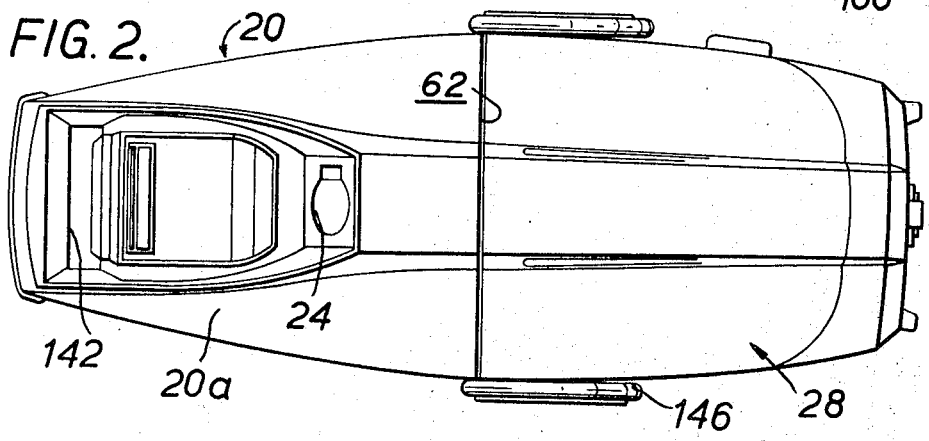
FIG. 2 is a plan view of the vacuum cleaner illustrated in FIG. 1.
Figure 3:
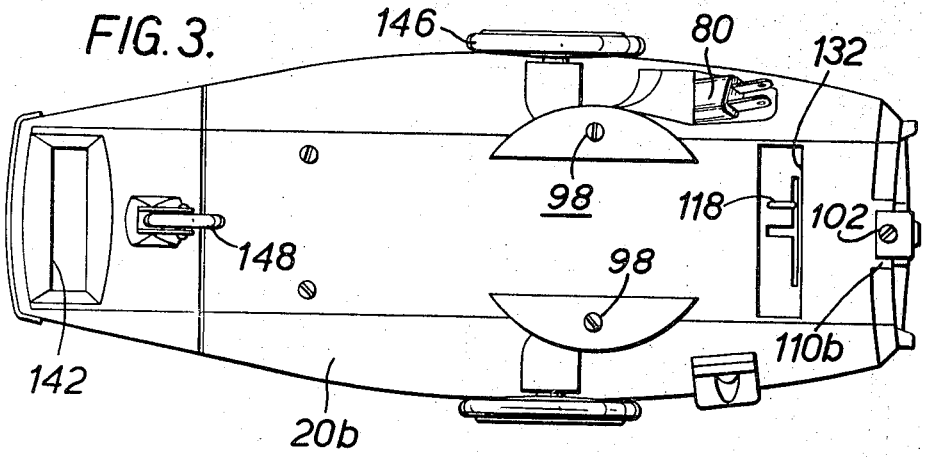
FIG. 3 is a bottom view of the vacuum cleaner illustrated in FIG. 1.

Referring now to the drawings and particularly to FIGS. 1 through 5 inclusive, there is shown a vacuum cleaner embodying the improved two-stage dust collecting arrangement for filtering dust and dirt from the input air in accordance with the present invention. The vacuum cleaner is illustrated as having a cleaner body generally indicated by the reference numeral 20. The cleaner body 20 is preferably of a hollow cylindrical configuration having a substantially conical shaped and horizontally elongated front end portion 22 and includes a hollow semi-cylindrical upper and lower body sections 20a and 20b assembled together in a manner hereinbelow described.

Figure 5:
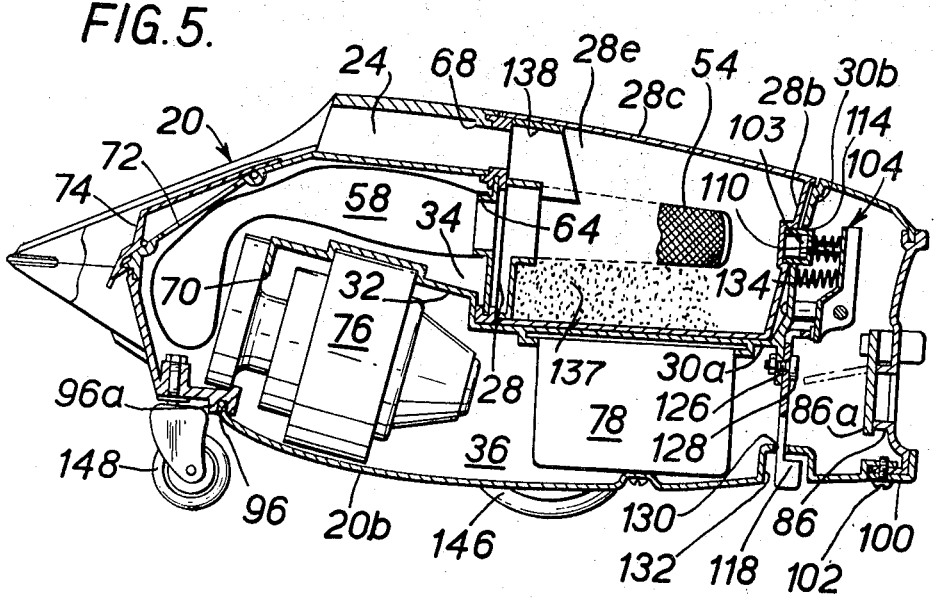
FIG. 5 is a cross-sectional side view taken substantially along the line 5—5 of FIG. 4.
Figure 6:
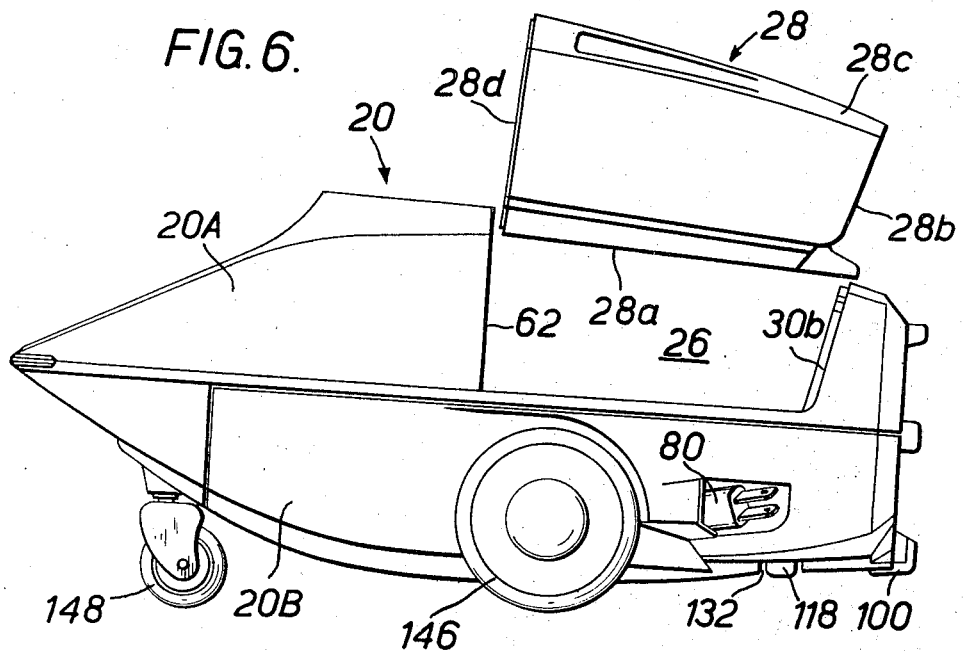
FIG. 6 is a side elevational view of the cleaner similar to FIG. 1 shown with the improved dust collecting casing being removed out of the cleaner body.

As shown in FIG. 5, the upper body section 20a is integrally provided at its front top with a longitudinally extending inlet fitting 24 adapted to be connected to a tubular suction hose (not shown) of well-known construction. The portion of the surrounding wall of the upper body section 20a immediately behind the rear end of the inlet fitting 24 is cut away to form an open space or cavity 26 for accommodating a dust collecting case 23 which is fully described hereinafter. The bottom and rear ends of the cavity are defined respectively by an intermediate support wall 30a horizontally extending between the cut-out sides and an upright support wall 30b vertically extending between the rear edge of the bottom wall 30a and the rear arcuate cut-out edge. Both the horizontal and upright walls 30a and 30b are integrally formed with the upper cleaner body 20a. The dust collecting casing 23 comprises a boxlike case or receptacle open at one end and closed at the other end. More specifically, the dust collecting case 23 is formed as an independent unit having such a semi-cylindrical configuration that, when positioned in place within the cavity 26, it fits perfectly thereinto to form an integral part of the upper cleaner body section 20a which exactly matches with its outer form. As clearly illustrated in FIG. 3, the dust collecting case 23 includes a bottom wall 23a and a rear wall 23b respectively which are joined together by a semi-cylindrical upper wall 23c. As shown in FIG. 5, this case 23 is adapted to be normally placed in position within the cavity 26 with its bottom wall 23a supported on the horizontal support wall 30a and its rear wall 23b located closely adjacent vertical support wall 30b. The horizontal support wall 30a includes a front extension 32 (FIG. 5) which extends towards the front end of the upper body section 20a. This extension wall 32 together with the horizontal support wall 30a divides the available space within the hollow cylindrical body 20, except that of the cavity 26, into two portions, i.e. upper curved space 34 defined between the front extension 32 and the front wall portion of the upper cleaner body 20a and a lower elongated space 30 formed between the horizontal support wall 30a including the extension 32 and the lower body section 20b attached to the upper section 20a. The dust collecting case 23 made as a separate, detachable unit further includes a pre-filtering means adapted to snugly fit into the front open end 28d of the case 28 and a pair of rearwardly extending projections 42 integrally provided on the rear wall 28b for guiding the case into the predetermined position within the cavity 26.

As clearly shown in FIGS. 10 and 11, the prefiltering means comprises a filter screen lid or cover 40. This screen lid 40 includes a peripheral support frame or flange 44 of a greater axial length having an external form in a vertical cross-section which generally corresponds to that of the dust collecting case 23 at its open end. A plurality of straight ribs 46 extend radially from the peripheral flange 44 to join a ring-shaped rib 43 in the center area of the flange. In the portion adjacent the top of the support flange 44 the pre-filter lid 40 is provided with an air inlet 50 for allowing air flow through the dust collecting case 23. A filter screen 52 which may be made of plastic materials, fine metal wires or the like and which has a relatively large mesh size is secured onto the peripheral flange 44, radial ribs 46 and circular center rib 43 to extend and cover the annular space or gap between the flange and the ring-shaped center rib 43 except the portion for the inlet opening 50. This radially extending screen 52 forms a radial filter portion of the filter screen lid which provides an air outlet of the dust collecting case 23. The screen lid 40 preferably has a nose cone 54 rearwardly projecting from the circular rib 45. The nose cone comprises a plurality of axial support ribs 54a surrounded by a screen 54b having a similar construction to that of the screen employed in forming the flat filtering portion 52.

Figure 7:
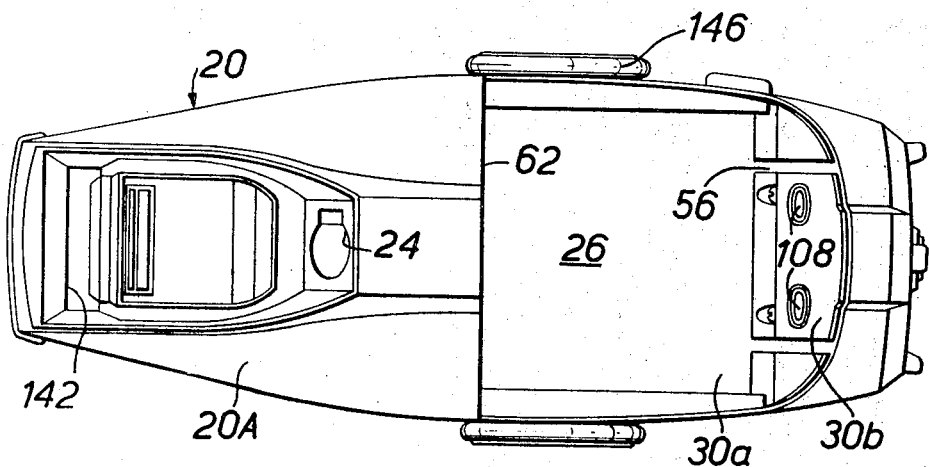
FIG. 7 is a plan view of the cleaner shown with the dust collecting casing completely removed from the cleaner body.
Figure 8:
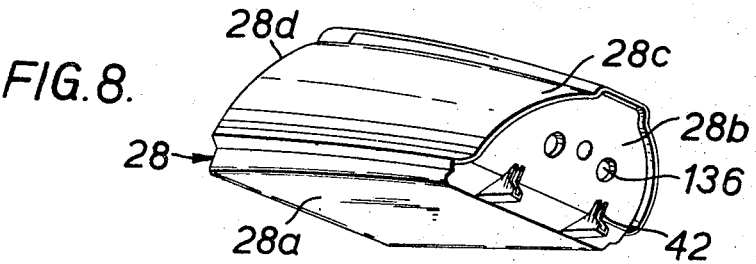
FIG. 8 is a perspective view of the detachable dust collecting unit.

With the above arrangement, the pre filter screen unit 40 may be slid into the open front end 23d of dust case 23 with the peripheral support flange 44 closely contacting the inner surface of the surrounding semi-cylindrical wall of the case 28 and with the nose cone portion 54 projecting into the case 28 towards its rear end wall 23b. Thereafter, the dust collecting case may be inserted in place within the cavity 20 guided by the pair of projections 42 which ride along a corresponding pair of guide grooves or channels 56 (FIG. 7) formed vertically in the exposed surface of the upright support wall 30b. In this position of the dust collecting case 28, the inlet opening 50 of the screen lid comes into direct alignment and communicates with the inlet fitting 24 of the body section 20a. The filter screen lid 40 placed in position within the open front end 23d of the case 23 forms a dust collecting chamber 28e within the case 28 and defines the outlet portion of the chamber 28e.

In accordance with the present invention, in addition to the above mentioned dust collecting unit, there is further provided a dust collecting bag to achieve a two stage dust collection which effects complete and more efficient removal of dust particles from the air stream through the vacuum cleaner. As shown particularly in FIG. 5, a dust bag 58, which may be constructed from a piece of cloth or other suitable material, is placed within the curved space 34. In order to support the dust bag 58 within the space 34 against the high pressure flow of input air, there is provided an intermediate support plate 60 (FIG. 14) having such suitable outer profile as to enable it to be snugly placed within the enlarged opening 62 defined by the exposed semi-circular edges which are formed when cutting off the portion of the semicylindrical wall of the upper cleaner body 20a immediately behind the inlet fitting 24. The support plate 60 is surrounded by an axially extending flange 64 to which the open end of the dust bag 53 is attached in a suitable manner as by sewing or bonding as best shown in FIGS. 5 and 14. A resilient packing member 66 surrounds the entire outer edge of the plate 60. A hole 66a is made in the top region of the packing 66 so that this packing member when put in position together with the plate 60 may not interrupt free and smooth flow passage of air through the inlet fitting 24 and inlet opening 50 into the dust collecting chamber 23e. The support plate 60 having the dust bag and the packing member attached thereto is fittingly positioned within the enlarged opening 62 defined by the exposed semi-circular edge of the upper cleaner body section 20a with the outer peripheral portion of the packing 66 contacting the locating inner flange 63 integrally formed on the inner surface of the upper body section 20a. In this position of the support plate 60, the cloth dust collecting bag 58 extends entirely into the curved space 34, its closed end extending close to an enlarged opening 70 as illustrated in FIG. 5. It will be clear that the plate 60 also serves as a member which forms the front wall of the cavity 26.

The upper front wall portion of the upper cleaner body section 20a is provided with an access opening 72 having sufficient dimensions to enable the closed end portion of the dust bag 58 located in the roof 34 to be lifted out therethrough for the purpose hereinafter discussed in detail. A cover member 74 normally closes the opening 72. The dust bag receiving space 34 directly communicates with the lower utility space, or air discharge chamber, 36 through the opening 70. Within the front or upstream portion of the chamber 36 there is resiliently supported a motor fan unit 76 of known construction for causing air to flow swiftly through the cleaner with its suction side confronting the dust bag chamber 34. In the rear portion of the chamber 36 is a box like receptacle 73 which is fixedly secured onto the underside of the horizontal support wall 30a and which contains a reel (not shown) for winding up a predetermined length of electric cord for supplying electric power to the motor fan unit 76 of the cleaner from a suitable A.C. power supply line. Only an electric plug 30 which is connected at one end of the electric cord for insertion into a plug socket is illustrated in the drawings. When it is desired to operate the vacuum cleaner, a user may pull out the plug 30 so as to unwind the electric cord from the supply reel a desired length.

As shown best in FIG. 13, a large diameter opening at the rear end of the cleaner body 20 may be covered with a suitable means. In the illustrated embodiment of the present invention, this cover means comprises a circular end plate 32 of a simple construction which greatly facilitates its assembly with the body section 20a and 20b. As shown in FIG. 13, the end plate 32 is formed in its upper half portion with a plurality of vertically extending elongated apertures 34 which serve together as an air discharge port when it is assembled in position with the body sections. The end cover plate 32 is further provided in the lower portion thereof with a blower air discharge port 36 for receiving a tubular coupling member for a blower attachment when it is desired to use the cleaner as a blower. A relatively small covering 36a pivoted to the inner surface of the end plate 32 (see FIG. 5) normally shields the blower air discharge port 36. In order to assure the easy and rapid assemblage of the end plate 82 with the cleaner body sections 20a and 20b, the plate 82 has a generally L-shaped hook projection 83 integrally formed therewith at the outer edge which extends axially rearwardly and includes a recess 33a. As a complementary means to this L-shaped hook 33, a rearwardly extending projection 90 is provided near the top of the semi-circular opening at the rear end of the upper cleaner body 20a. Further, with respect to this semi-circular rear end of the upper body section 20a, there is formed a groove 92 in the semi-circular or arcuate inner edge having an axial width substantially equal to or slightly greater than the thickness of the end plate 32 for receiving the outer peripheral portion of the cover plate 82 in assembled relation. A groove 94 is also formed in the peripheral edge of the plate 82 for receiving the arcuate inner edge 95 of the lower body section 20b.

Figure 4:
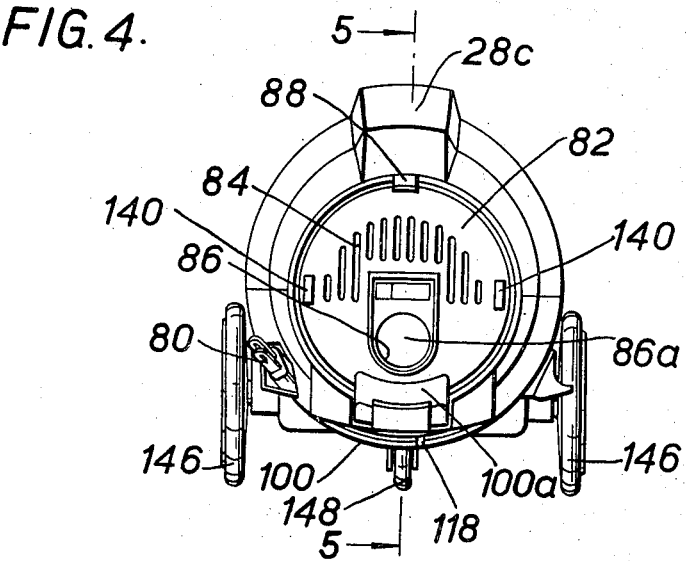
FIG. 4 is a rear end view of the vacuum cleaner illustrated in FIG. 1.

With the above construction, in order to put the upper and lower cleaner body portions 20a and 20b and the end cover plate 82 together to form an integrated main cleaner body 20, the circular end cover plate 32 may first be assembled to the upper body section 20a by fitting the outer periphery of the end cover plate 32 into the arcuate groove 92 and rotating the cover in either direction until the L-shaped hook 83 comes into engagement with the complementary projection 90 on the rear end of the body section 20a to ensure rigid mechanical connection between the plate and the upper body section. The lower cleaner body portion 20b is next joined to the upper cleaner body 20a by inserting the arcuate inner groove 95 at the its semicylindrical rear end within the peripheral groove 94 of the circular end cover plate 32 and placing the front arcuate end 96 of the lower body into a mating groove 96a formed around the lower half extension at the front end of the upper cleaner body portion 20a (FIG. 5). To keep the above disclosed components in assembled relation against any shock and forces, the lower semicylindrical cleaner body 20b is securely fastened to the bottom of a receptacle 73 as by screws 98. In addition, an L-shaped fastening bracket 100 may conveniently be placed with one leg portion thereof engaging the retaining projection 100a of the cover plate 82 and the other leg portion contacting the flattened surface 100b provided at the lowest region of the rear extreme end of the lower body 20b, as shown in FIGS. 4, 5 and 13. A fastening screw 102 is employed to secure the bracket to the flattened surface 100b. Thus, with the above arrangements, a simple and quick way of assembling the major covering components is readily attained without requiring any complex members.

Referring now in particular to FIGS. 5 and 12 of the drawings, a mechanism for locking the detachable dust collecting case 23 in place within the cavity 26 is now described in detail. As best illustrated in FIG. 12, this locking mechanism includes a locking plate 104 comprising upper and lower portions 104a and 104b. The locking plate 104 has a pair of push rods 106 fixedly secured to the upper half portion thereof so as to extend forwardly the longitudinal direction of the cleaner body 20. A generally cup-shaped push member 103 is inserted over each of said pair of push rods for axial sliding movement of the rods and the coil springs 110 placed over rods 106 between the push member 103 and the locking plate 104 normally bias the member axially towards the free end of the push rods. A stop flange 103 is integrally formed at the free end of each rod 106 as shown in FIG. 5 to limit the axial sliding movement of the push members over the rods. A pair of support arms 112 which are secured by suitable means to the upright wall 30b at one end and connected to the sides of the locking plate 104 by pins at the other end pivotally support the locking plate approximately at a point intermediate its upper and lower ends such that the push members 103 may extend forwardly through apertures 114 in the wall 30b when the plate is rotated counter clockwise. The locking lever generally indicated at 116 includes a lower operating end 113 and an upper actuating end 120 connected together by an elongated portion 122. The upper end 120 extends generally perpendicular to the elongated portion 122 of the lever and has a cam edge 120a which is sloped in one direction and adapted to engage with a vertical protrusion 124 formed in the lower portion 104b of the locking plate 104 at a point intermediate the opposite sides. As illustrated in FIG. 5, the lever 116 may be rotatably secured to the depending portion 126 of the vertical wall 30b by a suitable fastening means 128 with the operating end 113 projecting downwardly through an aperture 130 into the lever and accommodating recess 132 formed in the rear end region of the lower cleaner body 20b and with the upper driver end 120 extending towards the protrusion 124. As another coil spring 134 is positioned between the wall 30b and the upper portion 104a of the locking plate 104, the locking plate is normally urged to rotate in a clockwise direction (FIG. 12) pins bringing the vertical protrusion 124 into constant engagement with the sloped cam edge 120a of the lever 116. With this arrangement, when the lever 116 is caused to rotate in a counter clockwise direction as viewed in FIG. 12 by manipulating the operating end in that direction, the cam edge 120a of the lever, which is sloped from right to left towards a vertical plane including elongated portion 122 and is in close contact with the projection 124, pushes the locking plate 104 in a counter clockwise direction against the biasing force of the coil spring 134 urging the pair of push rods 106 together with push members 103 into a forward position in which the push members extend forwardly of the wall 30b through the holes 114 as shown in FIG. 5. When the lever 116 is caused to move in clockwise direction by hand operation the coil spring 134 forces the locking plate 104 in clockwise direction and the pair of push members 108 are retracted to a position immediately behind the wall 30b.

The operation of the locking device is now described in connection with the above mentioned dust collecting case 20. In order to hold the dust casing 23 in place within the cleaner body 20, it is first inserted into the cavity 26 with the pair of guide projections 42 riding down along the corresponding guide channel 56 formed in the wall 30b until it rests directly on the horizontal support wall 30a. When the dust collecting case 23 is thus completely fitted in position within the cavity, the lever 116 is moved by hand to thrust the push rods 106 together with the members 108 into the forward position as defined above. As the push rods shift to this forward position, the push members 103 enter the hollow depressions 136 formed in the rear wall 23b of the case 28 and drive it forwardly against the resilient packing 66 fitted around the intermediate plate 60 under the biasing force of the coil springs 110 bringing the front edge of the casing 28 together with the screen lid 40 into tight pressure engagement with the packing. As the result of this pressure engagement, the intermediate plate 60 with the resilient packing 60 is firmly held in position between the inner flange 63 and the open front end 28d of the casing.

In this condition, the pair of rear projections 42 riding within guide channels 56 jointly with the push members 103 penetrating into the depression 136 prevent the transverse movement of the case 28 with respect to the upper cleaner body 20a in the direction perpendicular to the longitudinal axis thereof during operation of the cleaner. Further, any vertical movement of the dust collecting case 23 is effectively inhibited by the push members 103 entering and engaging the rear depressions 136 with predetermined pressure force. In this manner, the dust collecting case 23 is positively locked up in the cavity 26 against any forces including vibration which tend to remove the casing out of the cleaner body 20a during operation. When it is desired to remove the dust collecting case 23 for dislodging the dust accumulated within the case as hereinbelow described, the user may simply move the lever 116 by hand manipulation in the opposite direction. Such operation causes the push members 103 to move away from the depressions 136 into their retracted position immediately behind the rear upright wall portion 30b in the manner already described above.

This in turn releases the dust collecting case 23 of any locking forces and restricting engagement and the dust collecting case 23 is now ready to be taken out of the cavity 26 by hand.

The operation of the vacuum cleaner constructed as above in accordance with the present invention is next explained in detail. With the dust collecting case 23 being fitted and locked in place within the upper body section 20a and a tubular suction hose (not shown) being connected to the inlet fitting 24 by inserting it into the fitting, the motor fan unit 76 is energized to initiate suction of air into the cleaner for effecting vacuum cleaning. During operation of the motor fan unit, air carrying dirt and dust away from the surface being cleaned rushes through the inlet fitting 24 and the inlet opening 50 into the dust collecting chamber 28e within the case 23. This air flow through the inlet 50 towards the rear wall 23b of the casing is U-turned or deflected in an opposite direction by the back wall 23b and passes through the screen lid 40, the oval-shaped entrance 62 of the plate 60 and into the dust bag receiving passage 34. From there air flows through enlarged hole 70 into the utility chamber 36 and through the plurality of vertical apertures 34 in the end cover plate 32 rearwardly out the cleaner body 20. During this passage as the air is U-turned within the case 23 towards its outlet screen lid, dust and dirt of relatively large mass or side such as rugs or torn pieces of cloth and paper and the like carried by the air stream into the cleaner are filtered from the air by the screen lid 40 having the comparatively large filtering mesh before it enters into the dust bag 58. This dust of large size filtered or trapped by the screen lid 40 accumulates onto the radial filter partition 52 of the lid under the nose cone 54 in layer after layer until the dust collecting chamber 28c is completely filled up. As the trapped dust mass gathers on the lid, it is compacted by the high pressure stream of air and following dust mass impinging thereon. Thus, an efficient use of the available space within the dust collecting case 23 becomes possible i.e. a relatively large amount of dust can be packed in the predetermined space 23e of the dust collecting case. Further, as the dust of larger size is piled and compressed tightly on the screen lid 40 in layer along a bottom generation line of the nose cone portion 54, this compacted body of air 137 (FIG. 5) serves as an additional filtering medium which removes comparatively smaller size dust including fine particles from the air stream flowing through the chamber 28e. As the dust collection in the chamber proceeds, the layer of dust piled onto the screen lid 40 covers the entire area of the radial filtering portion 52 of the lid with the thickness of the dust layer becoming greater which results a gradual increase of flow resistance against the air passage through the chamber 23e. This increase of flow resistance lowers the filtering efficiency of the cleaner before the dust collecting chamber 23e becomes fully occupied with the collected dust and dirt. At this point, attention should be directed to the fact that the screen lid 40 is formed with the elongated, cone-shaped nose portion 54 which longitudinally projects well into the dust collecting chamber 23e. With this construction, even though the dust accumulation proceeds to the point where the whole region of the radial filtering portion 52 becomes covered with a thick layer of compacted dust, this internally extending nose cone portion provides an additional filtering surface which permits relatively unobstructed passage of air therethrough for trapping a further quantity of larger dirt particles in an efficient manner within said chamber. The circular baffle flange 138 formed so as to surround the inner end of the inlet opening 50 directs the air flow through the opening onto the top surface of the nose cone 54, thereby to blow in the direction of a top generation line of the cone and keep that area from any dust accumulation even when the remaining filtering surface of the cone portion becomes encircled by the progressively piled dust body. Therefore, it will be apparent that the upper surface of the cone 54 remains as the only area free of dirt accumulation thereon until substantially all of the available space in the chamber 28e is filled with the collected dust, thereby maintaining good filtering effect of the screen lid 40 until such time.

The air which leaves the dust collecting chamber 28e may flow through the ellipsoidal entrance 63 into the fine mesh cloth filter bag 53. As the air passes through the bag, substantially all of the fine dust particles which could not be trapped by the large mesh screen lid 40 are filtered by this bag from the air before it moves through the motor fan unit 76. Thus, only dust free air is exhausted by the unit through the chamber 36 and through the elongated aperture 34 out of the cleaner. Thus, with the improved vacuum cleaner of the invention a two step dust filtering or collection from the drawn into and air through the cleaner is effected which assures a perfect as well as high speed and large volume of dust entrapment. In actual practice, almost all of the dust and dirt including fine particles carried into the cleaner by the air is initially retained by the screen lid which forms the first filtering stage and a comparative small amount of fine dust particles pass through the lid 40 to be filtered by the dust collecting bag 58 which constitutes the second filtering stage.

Figure 9:
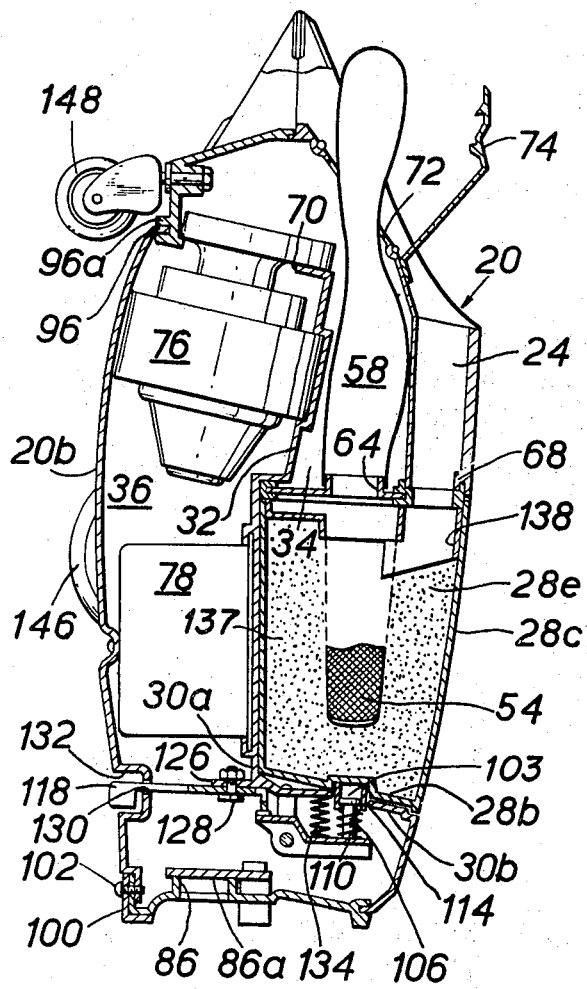
FIG. 9 is a cross-sectional view of the vacuum cleaner similar to that of FIG. 5 with the cleaner body shown in an upright position and with the closed end portion of a dust bag shown being taken out of the cleaner body through its access opening.

For disposing of the dust body and fine particles collected respectively in the dust box 23 and the cloth bag 58, the user may first deenergize the motor fan unit to stop the cleaning operation of the cleaner and then put the cleaner in an upright position as illustrated in FIG. 9 with the plurality of support blocks 140 formed in the end cover plate 32, the hook projection 88 and the bracket 100 resting on the floor (not shown) to support the body in such position. The handle portion 142 at the front extreme end of the upper cleaner body 20a constitutes a convenient means for setting the cleaner upright on the floor by hand. After placing the cleaner in such a vertical position, the cover lid 74 is opened to grip and take the closed end portion of the dust bag 58 out of the elongated bag receiving space 34 through the accessible opening 72. The gripped end of the bag 58 is than shaken vigorously to shake off the fine dust particles collected in the bag 58 onto the exposed surface of the radial portion 52 of the screen lid 40 surrounded by the outer flange 44 and into the hollow conical space formed in the cone shaped nose portion 54 of the lid 40. Thus, the screen lid 40, in addition to its principle function as a filtering medium for removing relatively large dust and dirt particles from the input air, also serves as a receptacle for receiving the fine dust particles shaken off the dust bag 58. After the fine dust particles originally trapped in the cloth bag are placed on the exposed surfaces of the screen lid 40, the locking lever 118 is then manipulated to unlock the dust collecting casing 23 permitting it to be withdrawn laterally (as viewed in FIG. 9) out of the upper cleaner body portion 20a. At this point, the user may first take out the screen lid 40 from the case 23 and then dispose of the quantity of fine dust particles which is held on the exposed side of the funnel or saucer shaped screen lid 40. Thereafter, the user may dispose of the compacted mass of dust and dirt collected in the case 23 for example, by turning the casing upside down. As noted above, dust and dirt collected in this casing area pressed tightly into a compact mass or body by the high pressure air stream during operation of the cleaner. The disposal of the dust mass can readily be accomplished simply by inverting and slightly shaking the case without causing the compressed dust body to be broken off into small fragments or be scattered about. The fact that the dust and dirt which accumulate in the dust collecting case are firmly pressed together into a compact mass greatly facilitates the disposal thereof as noted above. When the disposing of dust and dirt collected in the case is finished, the screen lid 40, which is now cleared of any fine dust particles, may again be slid and fitted into the front open end 28d of the empty casing 23 with the nose cone portion 54 projecting thereinto. The dust collecting case having the screen lid 40 placed therein is then inserted into the cavity 26 guided by the rear projections 42 riding in the channels 56 and the lever 116 is again operated by hand to lock the casing 28 in predetermined position within the cleaner body 20 as hereinabove described in detail. Meanwhile, the closed end of the dust bag 58 pulled out of the room 34 for removal of the collected dust particles is also placed back into said dust bag receiving space 34 with subsequent closure of the access opening 72 by the cover 74.

When all of this has been done, the vacuum cleaner is set horizontally on the floor with a pair of large wheels 146 and a small front wheel 143 supporting and carrying the entire body 20, the cleaner being ready to be operated again for vaccum cleaning of floors, walls, furnitures and the like. With respect to the temporary function of the screen lid 40 so a means for receiving an amount of shaken off fine dust particles, the radial filtering portion 52 of the screen lid 40 may preferably be depressed slightly inwards i.e. to the left as viewed in FIG. 10 in the general shape of a bowl.

When it is desired to use the vacuum cleaner as a blower, a suitable tubular hose coupling (not shown) for a blower attachment is inserted through the cylindrical aperture 36 formed in the rear cover plate 82. It can be appreciated that when inserted into the aperture 36 the tubular hose coupling pushes the hinged shield 36a upwardly into a position shown in dotted lines in FIG. 5. With the shield plate in its upward position, substantially all of the dust free air flowing rearwardly through the space 36 which normally passes through the plurality of vertical apertures 84 is diverted into the hose coupling for the blower tool. Thus, the vacuum cleaner of this invention can readily be converted into a blower device.

Figure 15:
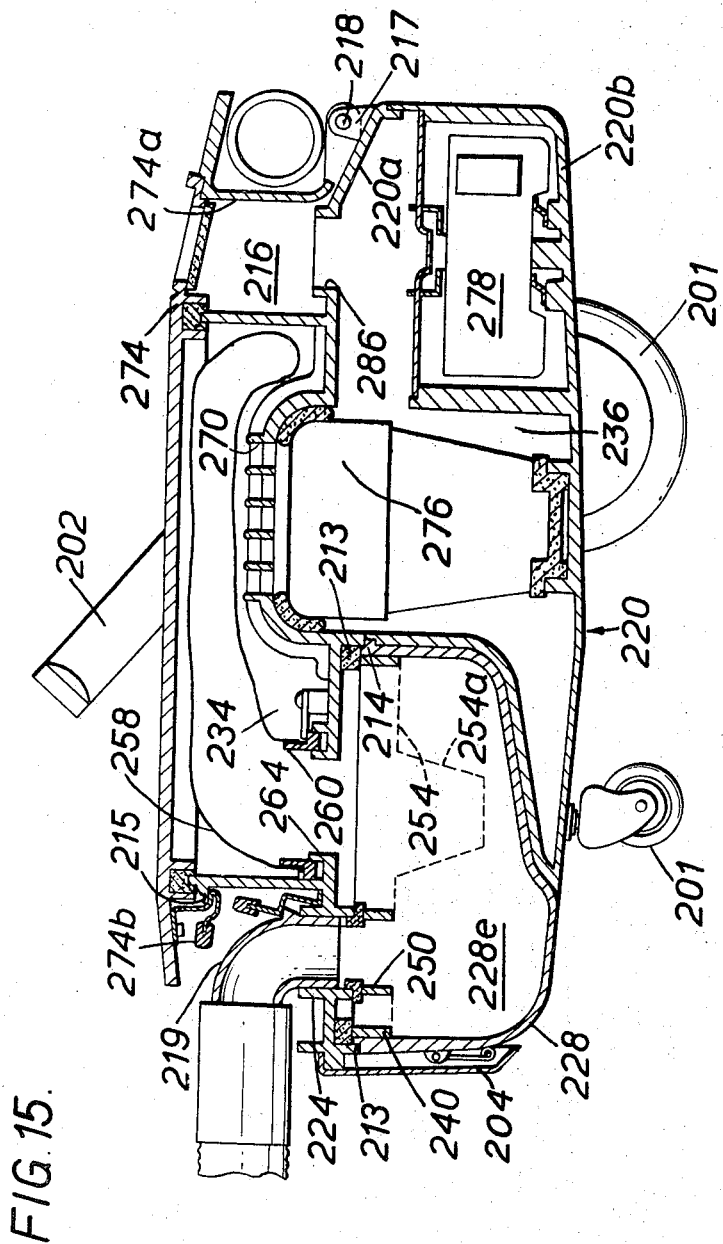
FIG. 15 is a view partly in cross-section similar to FIG. 5 of another embodiment of the invention.

FIG. 15 illustrates another embodiment of the invention in which the dust collecting case is mounted at the front end of the body. Referring to FIG. 15, the vacuum cleaner illustrated therein has a cleaner body generally indicated by the reference numeral 220. The cleaner body 220 may preferably be of a hollow cylindrical or square prism configuration extending in a horizontal direction. The body 220 comprises an upper body portion 220a and a lower body 220b which are joined and fixed to each other to form a complete body. The upper body portion 220a cooperates with a top cover plate 274 to define a substantially horizontally extending passage 234 having an inlet opening 264 toward the front end and an outlet opening 270 toward the rear end. These two openings 264 and 270 are both formed in the bottom wall of the upper body portion 220a.

The lower body portion 220b cooperates with the bottom wall of the upper body portion 220a to define a space 236 for containing a motor fan unit 276 and a case 273 for an electric cord supplying electric current to the motor fan unit 276. There is also a discharge outlet 236 which may be covered by an extension 274a of the top cover 274. The extension 274a includes a discharge opening which communicates with the discharge outlet 286.

The rear end of the extension 274a of the top cover 274 is pivotally carried at a pin 213 supported by a bracket 217 which is fixed to the upper body portion 220a at its tail end so that it may open and close the top of the passage 216. The reference numeral 274b indicates a hook mounted to the cover 274 and engageable with a complemental projection 215 formed in the front wall of the upper body portion 220a so that the cover 274 may be secured and maintained in a closed position as shown in FIG. 15.

The body 220 is integrally provided toward its front end with a vertically extending inlet fitting 224 adapted to be connected to a tubular suction hose 219 of well-known construction.

A dust collecting case 228 is detachably secured to the body at the space below the front part of the upper body portion 220a and in front of the lower body portion 220b to form a dust collecting chamber 223e. The dust collecting case 223 is formed as an independent unit and comprises a bowl like receptacle having an opening 214 at its top end. The top edge 213 defined the opening 214 forms a hermetic seal with the bottom wall of the upper body portion 220a. The rear bottom wall of the case 223 matches and contacts the front wall of the lower body portion. The reference numeral 204 indicates a clamp means for securing the dust collecting case 228 to the upper body portion 220a.

The top opening 214 of the dust collecting chamber 228 is closed by a detachable screen lid 240 which has an opening 250 which directly communicates with the inlet fitting 224. The portion 254 of the lid 240 opposing the inlet opening of the passage 234 is made of a screen having a relatively large mesh. The portion 254 is preferably shaped in a funnel or saucer form having a nose 254a extending into the dust collecting chamber 223e.

In the passage 234 of the upper body portion 220a there is contained a dust filtering and collecting bag 258 which may be constructed from a piece of cloth or other suitable material. The mouth piece 260 of the dust bag 253 at its open end is secured by a suitable means to the edge defining the inlet opening 264. The bag 253 is therefore directed vertically upwards and then substantially horizontally rearwards within the passage 234.

The reference numeral 201 indicates wheels for carrying the body 220 and 202 indicates a handle.

The operation of the vacuum cleaner illustrated in FIG. 15 is similar to that illustrated in FIGS. 1 to 14.

With the dust collecting case 223 being fitted and locked in place as shown in FIG. 15, the motor fan unit 276 is energized to initiate suction of air into the cleaner for effecting vacuum cleaning. During operation of the motor fan unit 276, air carrying dirt and dust away from the surface being cleaned rushes through the inlet fitting 224 and the inlet opening 250 into the dust collecting chamber 228e within the case 228. This air flow through the inlet opening 250 is substantially U-turned in an opposite direction by the bottom wall of the case 228 and passes through the screen lid 240 and the entrance 264 into the dust bag receiving passage 234. From there air flown through the outlet opening 270 into the utility chamber 236. During the passage as the air is U-turned within the case 228 towards its outlet defining screen portion 254, dust and dirt of relatively large means or size such as rags or torn pieces of cloth and paper and the like carried by the air stream into the cleaner are filtered from the air by the screen portion 254 having a relatively large filtering mesh before it enters into the dust bag 258. This dust of larger size is filtered or trapped by the screen portion 254 in layer after layer. As the trapped dust mass gathers on the lid, it is pressed compacted by the high pressure jet of air and following dust impinging thereon. Thus, an efficient use of the available space within the dust collecting case 223 becomes possible i.e. a relatively large amount of dust can be packed in the predetermined space 228e of the dust collecting case. Further, as the dust of larger size is piled and compressed tightly on the screen portion 254 in layers along a front generation line of the nose cone portion 254a, this compacted body of dirt serves as an additional filtering medium which remove comparatively smaller size dust including fine particles from the air stream passing through the chamber 228c.

The screen portion 254 is integrally formed with elongated, cone-shaped nose portion 254 a which longitudinally projects well into the dust collecting chamber 228c.

Even though the dust accumulation proceeds to the point where the whole region of the screen portion 254 becomes covered with a thick layer of compacted dust, this internally extending nose cone portion provides an additional filtering surface which permits relatively unobstructed passage of air therethrough for trapping a further quantity of larger dirt in an efficient manner within said chamber. In addition, air flow through the opening 250 may blow onto the front surface of the nose cone 254a to keep that area free of any dust accumulation even when the remaining filtering surface of the cone portion becomes encircled by progressively piled dust. Therefore, it will be understood that the front side of the cone 254a remains the only area free of dirt accumulation thereon until substantially all of the available space in the chamber 228e is filled with the collected dust, which maintains good filtering effect of the screen lid 240 until such time.

The air which leaves the dust collecting chamber 228e may flow through the entrance 264 into the cloth filter bag 258. having a fine mesh. As the air passes through the bag, substantially all of the fine dust particles which could not be trapped by the screen portion 254 of large mesh are filtered by this bag from the air before it moves through the motor fan unit 276. Thus, only dust free air is exhausted by the unit through the chamber 236 and through the discharge opening 236.

For disposing of the dust body and fine particles collected respectively in the dust collecting case 228 and the cloth bag 258, the cover 274 is opened to take the closed end portion of the dust bag 258 out of the elongated bag receiving space 234 through the accessible opening. The gripped end of the bag 258 is then shaken vigorously to shake off the fine dust particles collected in the bag 258 onto the exposed surface of the screen portion 254 of the lid 240 and into the hollow cylindrical space formed in the cone shaped nose portion 254a. Thus, the lid 240, in addition to its principle function as a filtering medium for removing relatively large dust and dirt from the input air also, serves as a receptacle for receiving the fine dust particles shaken off the dust bag 253. After the fine dust particles originally trapped in the cloth bag are placed on the exposed surfaces of the screen portion 254, the dust collecting case is removed from the body. The user may then take out the lid 240 from the case 223 and dispose of the quantity of fine dust particles which is held on the exposed side of the funnel or saucer shaped screen portion 254. Thereafter, the user may throw off the compacted mass of dust and dirt collected in the case 223 for example, by turning the case upside down. As noted above, dust and dirt collected in this case are pressed tightly into a compact mass or body by the high pressure air stream during operation of the cleaner, the disposal of the dust mass can readily be accomplished simply by inverting and slightly shaking the case without causing the compressed dust body to be broken off into small fragments or be scattered about. The fact that the dust and dirt which accumulate in the dust collecting case are firmly pressed together into a compact assembly greatly facilitates the disposal thereof as noted above.

From the foregoing description of the preferred embodiments of this invention, it would be clear that by employing the two-step dust collecting or filtering system which comprises the dust collecting receptacle or case and the cloth bag located downstream of the first receptacle in the flow path of insucked air, the present vacuum cleaner can retain dust and dirt from the air flow in an amount substantially greater than was possible with the prior art vacuum cleaners. As a result of this increased dust storing capacity of the cleaner, it becomes unnecessary for the user to repeat frequently troublesome disposal of dust collected in the cleaner. In accordance with the present invention, a substantial portion of dust and dirt carried into the cleaner by air is trapped within the casing by the filtering action of the screen lid and is compressed together into a tight mass under the effect of high pressure air flow. Since the nose cone portion of the screen lid provides an additional filtering surface which extends into the dust collecting case substantially the entire axial length of the case in the radial center portion thereof, the air intake and therefore dust collecting capability of the cleaner is maintained at the desired maximum until the dust casing becomes really filled with accumulated dust and dirt. As will be readily understood, without the cone-shaped filtering portion of the screen lid dust of relatively large size which will be removed from the air by the screen lid accumulates in layers onto the radial filter portion of the lid which serves also as an air outlet of the casing. With the progress of vacuum cleaning operation, the dust layer on the radial portion grows thick enough to interrupte the free passage of inlet air through the casing which results in a substantial reduction of air intake or dust intaking ability of the cleaner itself. This in turn reduces the efficiency of the cleaning operation. Provision of the cone-shaped screen portion extending into the dust case avoids such disadvantages in that it provides at least a portion of relatively dust free or unclogged filtering surface within the casing until it is filled with dust to capacity. In other words, with the vacuum cleaner of the present invention incorporating the new dust collecting system the cleaning efficiency thereof is kept constantly at the desired level during operation until the time the system becomes completely packed with retained dust. The air baffle means formed at the rear end of the air inlet to direct a portion of air through the inlet onto a certain filtering surface in the nose cone of the screen lid assists in keeping at least a part of the nose cone free from any dust clogging.

According further to the present invention, the dust bag furnishes an additional filtering means especially for trapping fine dust particles which tend to escape through the wide meshes of the screen lid. The two-step filtering operation performed by the screen lid and the dust bag assures a complete and effective removal of dust carried into the cleaner by the inlet air. Moreover, the fact that the dust and dirt collected within the detachable cases are compressed tightly together into a compact mass enables not only an effective utilization of the available space in the casing but also an easy and simple removal of the accumulated dust mass out of the casing which spares housewives much time and efforts. In addition, according to the above disclosed embodiments of the invention, the separate dust collecting case is detachably located within the cleaner body in such a manner as to be readily withdrawn when necessary by the user. This also considerably facilitates disposing operation of the gathered dust mass. With respect to the collected quantity of fine dust particles in the dust bag, it can be removed onto the exposed surface of the screen portion by merely shaking the closed end of the bag as previously discussed. In case of the novel two-stage dust collecting system according to the invention, both the dust collecting case and the bag are available for repeated, long time use which is desirable in view of economy.

What is claimed is:

1. A tank type vacuum cleaner comprising a main housing having a recessed portion, a demountable case attached to said main housing formed to provide a dust collecting chamber, said case located in said recessed portion and forming a portion of the overall contour of said main housing and extending into the interior of said main housing, said case having an inlet opening and an outlet opening, said main housing having an inlet fitting adapted for connection to a suction hose through which collected particles are supplied to the vacuum cleaner, the outlet of said inlet fitting and said inlet fitting being separate from but in fluid flow communication with the inlet opening of said case when said case is mounted to said main housing, filter screen means located on said case and attached thereto covering the outlet opening thereof and having a portion thereof of relatively large mesh size located within in the fluid flow path between the inlet and outlet openings of said case so that particles of a relatively large size can be accumulated thereon and compressed in a layer to form an additional medium which can filter particles of relatively smaller sizes, the interior of said case also collecting particles of dust which do not pass through said filter screen, means forming a passage within said main housing, a filter bag located in said passage mounted separately from said case and having an inlet end in fluid flow communication with and covering the outlet opening of said case when said case is mounted to said main housing, means on said housing providing access to the interior of said passage and to said filter bag, said means forming said passage in which said filter bag is located also formed with an exhaust opening, a motor-fan unit located in said main housing adjacent said exhaust opening of said passage to produce upon operation thereof a fluid flow stream with collected particles entrained therein from said main housing inlet fitting, then through the inlet opening on the case, the filter screen and the outlet opening of the case, the filter bag and said exhaust passage, the particles passing through said filter screen being collected in said filter bag.

2. The vacuum cleaner of claim 1 wherein said inlet and outlet openings for said case are part of said filter screen means.

3. A tank type vacuum cleaner as in claim 1 wherein said filter screen has an elongated generally cylindrical portion which extends into said dust collecting case and defines a continuous surface, the inlet of said filter bag opening into said elongated portion of said filter screen so that the particles collected in said filter bag can be emptied into said filter screen and held therein for later removal when the dust collecting case is detached from said main housing.

4. The vacuum cleaner of claim 3 wherein said inlet and outlet openings for said case are part of said filter screen means and said elongated portion of said screen means overlies said outlet opening.

5. A vacuum cleaner according to claim 1 in which said inlet fitting is formed adjacent the top of said main housing and elongated in a substantially horizontal direction, said passage in which said filter bag is located being elongated and having a substantial portion thereof positioned beneath said elongated inlet fitting.

6. A vacuum cleaner according to claim 5 in which a portion of said elongated passage housing said filter bag lies forward of the front end of said inlet fitting and said dust collecting case is mounted to the rear of the outlet end of said inlet fitting and the end of the passage at which the inlet end of the filter bag is located.

7. A vacuum cleaner as in claim 5 in which said access means to said passage in which said filter bag is located comprises a lid.

8. A vacuum cleaner according to claim 5 in which said main housing has a rear end on which said housing may stand lengthwise, said access means to said passage containing said filter bag being accessible when said housing is standing lengthwise.

9. A vacuum cleaner according to claim 1 in which said inlet fitting is formed adjacent the top of said main housing and extends in a substantially vertical direction into said dust collecting case, said passage in which said filter bag is located being elongated and extending in a substantially horizontal direction so that the inlet end of said filter bag is adjacent and to the rear of said inlet fitting, said dust collecting case being located in said housing beneath said inlet fitting and a portion of said elongated passage.

* * * * *